H. P. NEPTUNE.
PNEUMATIC TIRE PRESSURE GAGE.
APPLICATION FILED AUG. 5, 1920.

1,396,141.

Patented Nov. 8, 1921.

INVENTOR.
Herman P. Neptune
BY A. B. Bowman
ATTORNEY

UNITED STATES PATENT OFFICE.

HERMAN P. NEPTUNE, OF SAN DIEGO, CALIFORNIA.

PNEUMATIC-TIRE PRESSURE-GAGE.

1,396,141.  Specification of Letters Patent.  Patented Nov. 8, 1921.

Application filed August 5, 1920. Serial No. 401,331.

*To all whom it may concern:*

Be it known that I, HERMAN P. NEPTUNE, a citizen of the United States, residing at San Diego, in the county of San Diego and State of California, have invented a certain new and useful Pneumatic-Tire Pressure-Gage, of which the following is a specification.

My invention relates to a pneumatic tire pressure gage for the purpose of indicating the pressure in a pneumatic tire and the objects of my invention are, first, to provide a pressure gage for pneumatic tires which is positioned in connection with the tire and rim and separate from the valve stem so that the pressure in the tire may be read at any time and no leakage occur by reason of or through the gage; second, to provide a gage of this class in which the pressure is determined by a device mounted between the inner tube and the casing of the vehicle wheel which operates a gage which extends through the felly and is readable inside of the felly of the wheel; third, to provide a device of this class which provides protection for the tube and confines the pressure to a certain predetermined area; fourth, to provide a device of this class by the use of which no opening is required in the tube, and fifth, to provide a device of this class which is very simple and economical of construction, durable, easy to operate, easy to install and which will not readily deteriorate or get out of order.

Figure 3:
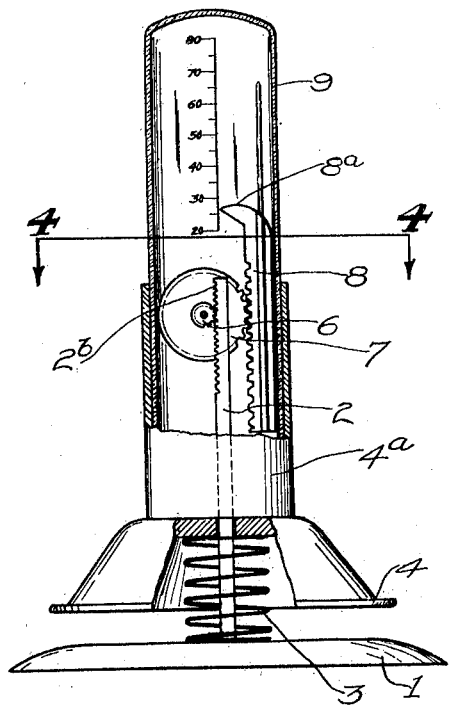
Figure 1:
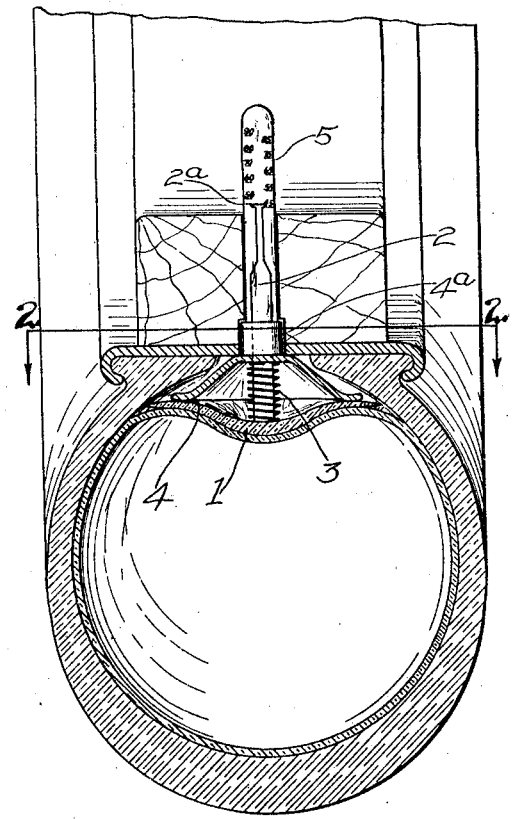
Figure 4:
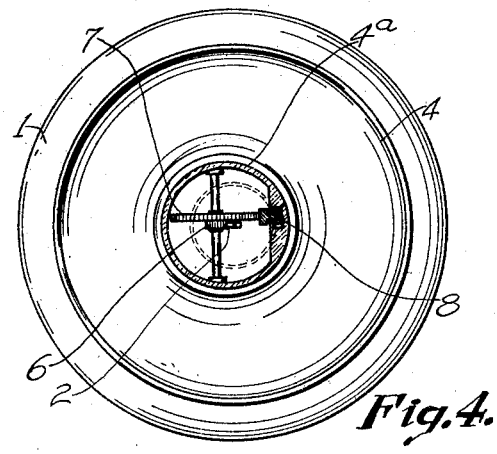
Figure 2:
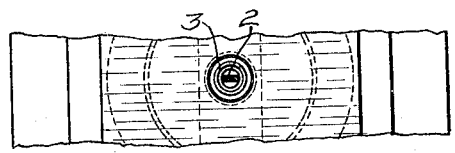

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a transverse sectional view of a tire, rim and felly showing my device in elevation in position thereon and showing a portion in section to facilitate the illustration; Fig. 2 is a fragmentary sectional view through 2—2 of Fig. 1; Fig. 3 is a side elevational view of the gage alone in a slightly modified form from that of Figs. 1 and 2 and on an enlarged scale and showing portions broken away and in section to facilitate the illustration and Fig. 4 is a sectional view through 4—4 of Fig. 3.

Similar characters of reference refer to similar parts and portions throughout the several views of the drawings.

The reinforcing pad 1, plunger member 2, spring 3, support 4 and cap 5 constitute the principal parts and portions of my gage in its preferred form.

The reinforcing pad 1 is a flexible member and secured to its center on one side by cementing, riveting or the like is the plunger member 2. Mounted around this plunger member 2 is the support 4 which is a frusto-conical shaped member provided with a nipple portion $4^a$ which extends up into a hole in the rim and felly and around the member 2. Mounted between the support 4 and the reinforcing pad 1 is a compression spring 3 tending to hold the member 1 away from the member 4. The upper end of the plunger 2 is provided with oppositely disposed extended lugs $2^a$ and mounted over the plunger 2 and fitted inside of the annular member $4^a$ is a transparent cap member 5 which is provided with a plurality of indicating characters in spaced rows which the lugs $2^a$ pass, in the movement of the plunger relatively to said cap for indicating the pressure in the tire as caused by the pressure on the pad 1 compressing the spring 3 and forcing the plunger into said cap.

In the modified form of construction shown in Fig. 3 of the drawings, the plunger 2 is provided with a gear rack $2^b$ on its upper end which engages a pinion 6 which is secured to a gear 7 which engages another gear rack 8 which is shiftably mounted in the cap 9 which is a transparent cap provided with only one row of indicating numerals and a scale so that the upper end of the rack 8, which is provided with a projection $8^a$, comes in close proximity to said scale thus providing for greater relative movement of the indicating lug by means of the gears and racks.

It will be noted that the pad 1, spring 3, support 4 and cap 5 are the same as in the preferred form except that the scale and indicator are single instead of double, although it is obvious that they may be double if desired.

Though I have shown and described a particular construction, and a certain modification thereof I do not wish to be limited to this particular construction, nor to the modification thereof but desire to include in the purview of my invention the construction, combination and arrangement substantially as set forth in the appended claims.

It is obivous that with this construction there is provided a means interposed between the tube, casing and rim of a pneumatic tire and extending through the felly for indicating the pressure of the tire at all times; that the device is separate and independent of the valve or valve stem and readily readable from the outside and that it is accurate, positive in its action, very simple of construction and will not readily deteriorate or get out of order.

Having thus described my invention what I claim as new and desire to secure by Letters Patent is:

1. A pneumatic tire pressure gage, including a flexible flap member, a plunger member secured in the center at one side of said flap, a bell shaped support member positioned around said plunger with its mouth covered by said flap, a spring interposed between said bell shaped support member and said flap and a transparent cap secured to said support receiving the free end of said plunger and provided with indicating symbols adapted to coöperate with said plunger whereby the pressure in the tire is indicated.

2. A pneumatic tire pressure gage, including a flexible member, a plunger member secured to one side of said flexible member, a bell shaped support positioned around said plunger with its mouth covered by said flexible member, a spring interposed between said bell shaped support and said flexible member and transparent means secured to said support coöperating with said plunger for indicating the pressure in the tire by the relative position of said plunger with said means.

3. A device of the class described, including a plunger member, a reinforcing flap secured to the end of said plunger member adapted to rest against the outer surface of a pneumatic tire, a spring interposed between said reinforcing member and the rim of said pneumatic tire, a transparent cap provided with numerals thereon adapted to coöperate with said plunger for indicating the pressure of air in the tube and a supporting member interposed between the rim and said reinforcing member around said plunger for limiting the movement of said reinforcing member.

In testimony whereof I have hereunto set my hand at San Diego, California, this 31st day of July, 1920.

HERMAN P. NEPTUNE.